March 14, 1933.  E. D. T. NORRIS  1,901,768
REGULATION OF THE VOLTAGE OF AN ALTERNATING CURRENT CIRCUIT
Filed Dec. 3, 1931
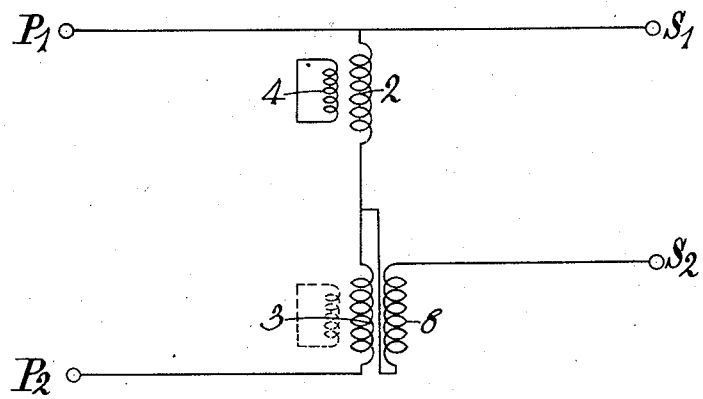
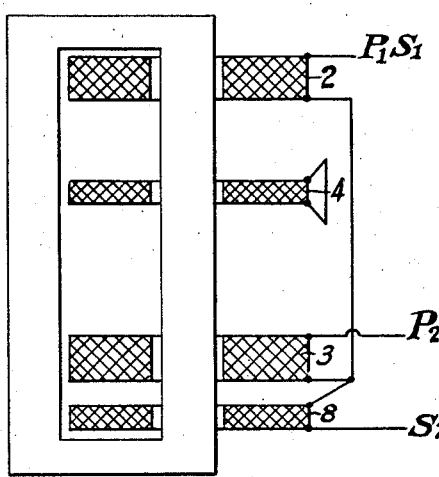
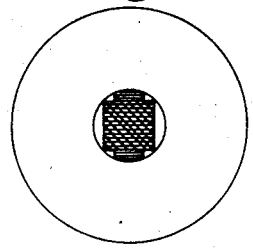
E. D. T. Norris
INVENTOR
By Marks & Clerk
Attys.

Patented Mar. 14, 1933

1,901,768

UNITED STATES PATENT OFFICE

ERIC DOUGLAS TOBIAS NORRIS, OF HOLLINWOOD, ENGLAND, ASSIGNOR TO FERRANTI INC., OF NEW YORK, N. Y.

REGULATION OF THE VOLTAGE OF AN ALTERNATING CURRENT CIRCUIT

Application filed December 3, 1931, Serial No. 578,755, and in Great Britain March 23, 1931.

This invention relates to the regulation of the voltage of an A. C. circuit without disconnecting the load or breaking the circuit.

Such results are usually accomplished by induction regulators or by transformers furnished with tappings. Induction regulators are only suitable for relatively small sizes and are expensive and difficult to construct mechanically while with tapped transformers means must be provided for changing the tappings without breaking the circuit or short-circuiting any two tappings. It is true many arrangements have been proposed for effecting the said tap changing but these are objectionable in that they are expensive, complicated, they change the voltage in steps instead of uniformly and they involve switches for breaking main or auxiliary circuits and connections to the tapping points.

The switches it is true are of small rating compared with the main system circuit breakers, yet where the gear is operated frequently, e. g. with automatic operation, the contacts periodically need attention and renewal.

As an alternative to these methods I have proposed hitherto a system of regulating the voltage of an A. C. circuit embodying two windings connected electrically in series and mutually disposed so as to possess considerable leakage reactance, a short circuited winding being capable of movement in relation to one or both of the windings for varying the relative impedance thereof, thus causing the relative voltage drop across the two windings to be varied at will.

According to the present invention I apply this system to an auto-transformer in such a way that the secondary voltage may be varied within very considerable limits, i. e. from zero to maximum obtainable.

The invention consists in an auto-transformer, one circuit of which comprises two windings electrically connected in series and possessing considerable leakage reactance, a short circuited winding inductively associated with said coils and movable in relation thereto, the other circuit of which comprises one of said first-mentioned coils, and the third winding closely associated electromagnetically with the other of said first-mentioned windings but serving to produce a voltage opposed thereto, said third coil being connected to the junction between the first-mentioned windings.

The accompanying diagrammatic drawing illustrates one convenient mode of carrying the invention into effect, Figure 1 being an electrical diagram showing the connections of the coils, Figure 2 being a vertical cross-sectional view of the device, and Figure 3 being a horizontal cross-sectional view of part thereof.

In the example illustrated it is desired to obtain variation of voltage across terminals $S_1$, $S_2$ varying from zero to a maximum value with a given fixed voltage applied between terminals $P_1$, $P_2$. An auto-transformer comprising coils 2, 3 and 8 is provided, the coils 2 and 3 being connected across the primary and being mutually disposed so as to possess considerable leakage reactance while the coils 2 and 8 are connected across the secondary circuit of the transformer, the coil 8 being closely associated electromagnetically with the coil 3.

A short-circuited coil 4 is provided capable of occupying the position shown in full lines or that indicated in dotted lines at will or any intermediate position. In the position shown in Figure 1 the short-circuited coil 4 is closely associated electromagnetically with the coil 2 and consequently causes the bulk of the potential difference across terminals $P_1$, $P_2$ to be dropped across the coil 3, and in these circumstances if the coil 8 be so formed and connected as to produce a voltage opposing this said voltage drop the potential difference across terminals $S_1$, $S_2$ will be zero. When the coil 4, however, is moved into the position indicated by dotted lines in Figure 1 the bulk of the applied potential difference will be dropped across the coil 2 and the maximum secondary potential difference produced across terminals $S_1$, $S_2$.

Any position of the coil intermediate between the two positions set forth above will produce intermediate potential difference across terminals $S_1$, $S_2$. By this means it will be appreciated that if the secondary circuit $S_1$, $S_2$ were connected, say, to the primary of a high voltage testing transformer then mere regulation of the short-circuited winding 4 would effect complete regulation of the secondary voltage of the testing transformer from substantially zero value to a maximum, whereas if the opposing winding provided in accordance with the present invention were omitted it would not be possible to reduce the voltage of the testing transformer below a quite considerable value on account of the fact that when the short-circuited coil is moved into position giving minimum secondary voltage this minimum voltage is necessarily of some finite magnitude.

It will be appreciated that in all cases it may not be necessary to reduce the minimum voltage value to zero, in which event the opposing coil need not fully neutralize the minimum secondary voltage obtaining in the secondary circuit.

Having now described my invention what I claim as new and desire to secure by Letters Patent is:—

1. An auto-transformer, one circuit of which comprises two windings electrically connected in series and possessing considerable leakage reactance, a short-circuited winding inductively associated with said windings and movable in relation thereto, the other circuit of which comprises one of said first-mentioned windings and a third winding closely associated electromagnetically with the other of said first-mentioned windings but serving to produce a voltage opposed thereto, said third coil being connected to the junction between the first-mentioned windings.

2. In a system of regulating the voltage of an A. C. circuit, a transformer, the primary circuit of which comprises two series connected windings connected to said supply and possessing considerable leakage reactance, a short-circuited winding capable of movement in proximity to said windings and a secondary circuit comprising one of said first-mentioned windings and a further winding tightly coupled electromagnetically to the other of said primary windings, said further winding serving to generate a voltage opposing that developed by the second of said primary windings.

In testimony whereof I have signed my name to this specification.

ERIC DOUGLAS TOBIAS NORRIS.